United States Patent [19]

Burke

[11] 3,869,484

[45] Mar. 4, 1975

[54] COATING COMPOSITION AND NOVEL COMPLEXER THEREFOR

[75] Inventor: Roger E. Burke, Savannah, Ga.

[73] Assignee: Union Camp Corporation, Wayne, N.J.

[22] Filed: Dec. 4, 1972

[21] Appl. No.: 311,452

[52] U.S. Cl.................. 260/404.5, 106/20, 260/22, 260/429.3, 260/429.9, 260/439
[51] Int. Cl............................................. C08h 17/36
[58] Field of Search................................. 260/404.5

[56] References Cited
UNITED STATES PATENTS

| | | | |
|---|---|---|---|
| 2,953,585 | 9/1960 | Groote et al...................... | 260/404.5 |
| 3,467,684 | 9/1969 | Lane................................. | 260/404.5 |
| 3,505,373 | 4/1970 | Olberg et al.................. | 260/404.5 X |

*Primary Examiner*—Lewis Gotts
*Assistant Examiner*—Ethel G. Love
*Attorney, Agent, or Firm*—Ryder, McAulay, Fields, Fisher & Goldstein

[57] ABSTRACT

A novel complexer for use in aqueous coating compositions formed from acidic resins, as well as the coating compositions, are described. The complexer is formed from a metal having a coordination value in excess of its valence and a polyalkylene polyamine along with, optionally, organic acids and cometals. The acidic resin, partially neutralized with ammonia, is added to the formed complexer to form the coating composition, a coordinate, which, upon drying, provides films which are water resistant and have excellent wet rub resistance. The coating compositions are particularly useful for inks, including gravure and flexographic inks.

7 Claims, No Drawings

COATING COMPOSITION AND NOVEL COMPLEXER THEREFOR

BACKGROUND OF THE INVENTION

The prior art has described the combination of metal salts with polymeric substances, including the use of such salts for complexing organic polymers and resins. Zirconium and zinc, for example, have been employed for the cross linking of polymer latices. Further, the zirconium and zinc have been used in a complex metal chelate with amine compounds, such as ethylenediaminetetracetic acid for curing acid functional polymers and resins. Such a use is known, for example, in the floor polishing art. When used in that manner, the applied, dried film can be removed only through use of ammonia solutions and other alkalies will not act upon the film. In these uses, the metal ions are attracted to the oxygen-containing groups of the resin and it is for this reason that the ammoniacal solutions will break down the formed film, while other alkalies and detergents will have, essentially, no effect.

For example, the prior art includes disclosures such as in U.S. Pat. No. 3,129,176—Ihde, Jr.—where a metal salt is complexed with a siliceous amino compound which can be used as an additive for printing inks to provide the proper balance of tack, penetration, and viscosity. The amino compound used in that case is a partial amide prepared by reacting a monocarboxylic acid and a polyamine.

Rogers, U.S. Pat. No. 3,320,196, describes a coating composition formed from a polyligand alkali-soluble resin, a polyligand polymer, and a zirconyl-fugitive ligand complex which is capable of undergoing ligand exchange with at least some of the carboxyl groups of the organic film former. One typical complexing agent is ammonium zirconyl carbonate.

U.S. Pat. No. 3,328,325—Zdanowski—teaches a floor polishing composition containing an alkali soluble resin and the ammonia or amine complex of a polyvalent metal salt where the salt has an appreciable solubility in water. These components form only a minor part of the floor polishing composition which also contains a water-insoluble polymer and a wax. Similar compositions are shown in Fiarman et al., U.S. Pat. No. 3,467,610, and Gehman et al., U.S. Pat. No. 3,554,790.

Ink binder resins have also been neutralized with amine compounds with the formation of ammonium salts. This is shown in a variety of patents including U.S. Pat. No. 1,789,783—Silberstrom; U.S. Pat. No. 2,449,230—Irion; U.S. Pat. No. 2,690,973—Voet; U.S. Pat. No. 3,412,053—Pugliese; and U.S. Pat. No. 3,470,054—Tyrrell.

In each of these prior art systems the performance of the product, as a function of the metal modification, is directly dependent upon the stoichiometric relationship of the metal to the oxygen-containing groups. In general, the primary coordination is with the carboxyl groups.

SUMMARY OF THE INVENTION

In accordance with the present invention a novel complexer for acidic resinous materials has been developed where the properties of the product, which are extremely advantageous, are not dependent upon the stoichiometric relationship of the metal and the oxygen-containing groups of the acidic resin. According to the present invention, the coating composition can be formed as an aqueous solution of the complexer and the acidic resin which may be either clear or pigmented. The solution dries under ambient conditions and becomes resistant to water, exhibiting an extremely high rate of dry. This high rate of dry is enhanced by forced air or heating. This is true whether the coating composition is clear or pigmented. The coating compositions according to the present invention, in the form of aqueous solutions, exhibit viscosity stability on storage over a considerable period of time, such as several months and, when dried, produce films of extremely high gloss.

The crux of the present composition is the complexer which coordinates with the acidic resin in the coating composition to form the film having, inter alia, high gloss, high wet rub resistance, and quick drying properties. The essential components of this complexer are a metal, which can be added in the form of the metallic compound, such as an oxide, a salt, or a soap, and an amine. The metal is one which has a coordination value in excess of its valence including, for example, zinc, zirconium, cobalt, and nickel. The particularly preferred metal is zinc, primarily for reasons of economy. Zinc, for example, has a valence of 2+ but a coordination value in compounds of up to 6+. For various purposes, others of the metals listed can be efficaciously employed.

Zinc-based complexers which are prepared with metal coordination values of from about 3.5 to 5.5 have several significant performance characteristics when employed in the final coating composition. For example, the final coating compositions made with such complexers exhibit improved holdout on paper. The films formed from these coating compositions also exhibit faster development of water resistance and a superior final water resistance. Further, improved wash-up and water reduction of pigmented systems are often obtained without pigment flocculation.

The amine employed as an essential portion of the complexer is a polyalkylene polyamine of the formula:

where $a$ is from 2 to 3, $n$ is from 2 to 5, and R is selected from the group consisting of hydrogen and methyl. Preferably R is hydrogen and $a$ is 2. The most preferred polyalkylene polyamine is triethylene tetramine. The ratio of the metal to the amine in the complexer is particularly important in determining the properties of the ultimately formed film from the coating composition. In general, there should be from 0.9 to 6 moles of amine for each mole of metal, but the specific ratio will depend upon the properties desired in the ultimately formed film. For example, when ultimate wet rub resistance is desired, the preferred ratio is 3.5 to 5.5:1, most preferably about 4.7:1. When optimum drying rate is the desired property, the preferred ratio is 0.9 to 1.5:1.

An optional component of the complexer is a monobasic or dibasic aliphatic carboxylic acid. Such acids can improve the rate of metal chelation and improve both the solubility and solution stability of the final, aqueous vehicle as well as of the complexer. The amount of acid present can vary from 0 to 1 mole for each mole of metal, preferably from 0.25 to 0.75 mole, and most preferably from 0.25 to 0.5 mole of acid for each mole of metal. Monobasic aliphatic acids include the $C_6$ to $C_{18}$ acids while the dibasic acids include those in the range of $C_4$ to $C_{12}$. If desired, aromatic acids can be used. The water reducibility and viscosity of the final, aqueous vehicle can be strongly affected by the character of the particular acid modifier.

A further optional component of the complexer is a cometal to be used in conjunction with the metals described above. Such cometal need not necessarily have a coordination value in excess of its valence.

An important parameter in utilization of the complexer is the free amine component (FAC) of the complexer. The FAC is defined as the equivalents of amine which remain unreacted, by either the metal in the complexer or the modifying acid, for each 100 grams of 100 percent solids complexer. The amount of complexer employed in combination with the acid resin, to be described below, is based upon the free amine component of the complexer and this ratio is generally indicative of the properties of the final coating composition. For example, optimum water resistance is obtained when the FAC of the complexer is stoichiometrically equal to the carboxyl equivalents of the resin. Of course, for optimization of other properties, different FAC-carboxyl ratios may be used.

The method of preparation is important and significantly different products can be produced employing the same composition. Two preferred methods exist for the preparation of the novel vehicles of the present invention. The first method involves the preparation of the complexer independent of the aqueous acidic resin dispersion and the second involves preparation of the complexer in situ with addition of the acidic resin. It has been found that these two methods optimize both the performance value and the process time required to achieve these properties.

In the first method, the metal-amine complexer is formed in an aqueous solution with a minimum of 30 percent water. Preferably, the solids content of the solution is approximately 50 percent. A separate dispersion of the acidic resin, neutralized with ammonia to a pH of approximately 6.5 to 7.5, is formed into a workable dispersion after which the complexer solution is added, preferably at a temperature of greater than 70°C, most preferably at reflux. After this addition, the solution is cooled to 65°C and adjusted to the finally desired pH of about 8.0 to 10.0, depending upon the end use. Non-volatile and pH adjustments are made with addition of ammonia or water.

In the second, or in situ method, of complexer formation, the complexer is prepared in all of the water which is to be included in the ultimate coating solution or varnish. A quantity of ammonia is then added to the dilute complexer solution and the desired acidic resin is added at approximately the reflux temperature of the composition. This mixture, with the undissolved resin particles, is heated to reflux until solution and is then cooled to 65°. The pH and non-volatile content are adjusted as in the first method.

A large number of acidic resins may be employed in forming the coating solution or varnish. The acidic resins generally have an acid number from about 30 to 400 and are capable of coordination to a metal-amine complex in aqueous solution. The choice of the resin is primarily based upon the end use in which the coating composition is to be applied. Among the resins which can be used according to the present invention are polyester resins, such as those formed by the condensation of a polybasic acid and a polyhydroxy alcohol and such resins which are modified with fatty acids or oils, rosin, and rosins modified with materials such as maleic, fumaric, and acrylic acids. Also included are rosin-based maleic modified resins and modified maleic resins and their esters capable of alkali dispersion such as the copolymer products resulting from the vinyl polymerization of styrene and maleic anhydride; alkali dispersible esters of epoxy resins such as those disclosed in U.S. Pat. No. 3,355,401—Tanner; acrylic acid polymers, copolymers, and related monomer acids capable of alkali dispersion; shellac and related naturally occurring resin acids; and blends of the foregoing acidic resins.

The various acidic resins referred to above must be capable of effective alkaline dispersion at pH's of from about 4.0 to 7.5. These dispersions need not be clear or stable, but need only be workable, primarily in the sense of viscosity and suspension, in such a way that the complexer can be effectively added at temperatures to reflux. To some degree, however, the stability of the resulting coating composition is adversely affected as the solubility of the resin decreases in aqueous alkali solution.

The amount of acidic resin incorporated is dependent, in general, on the amount of free amine in the complexer. Generally, the ratio of the free amine component in the complexer to the carboxyl group in the resin should be approximately 1:1, that ratio providing the maximum in wet rub and water resistance. The lower limit of the ratio is approximately 0.4:1 and such compositions generally show a decrease in varnish viscosity and thixotropy, with an increase in block point. It is possible, according to the present invention, to obtain films with a 100 percent gloss reflectance.

The solids content of the coating compositions of the present invention can vary from about 15 to 70 percent by weight. The upper limit is imposed by formability and the lower, generally, by economics.

In addition to the materials referred to above, various modifying agents can be incorporated. Included among the modifying agents are a cosolvent, in place of a portion of the water, in formation of the complexer or as an addition to the final coating composition. In particular, alcohols and esters have proven effective in, for example, modification of viscosity. Various antifoam agents can be added, particularly the silicones. Further, protective colloidal and surface active compounds can be included in the composition for particular purposes.

It is an object of the present invention to provide a novel complexer for formation of coating compositions including acidic resins.

It is a further object of the present invention to provide a method of forming complexers for coating compositions which include acidic resins.

It is a still further object of the present invention to provide coating compositions formed with a complexer and having particularly desirable properties.

DESCRIPTION OF THE PREFERRED EMBODIMENT

As previously indicated, the coating composition of the present invention is formed in aqueous solution and includes, as essential components, a complexer and a partially neutralized acidic resin. The crux of the composition is the complexer which is employed and, accordingly, it will be defined in the most detail.

The two essential components of the complexer, which is formed in a solution containing at least some water, are a metal and an amine. The metal, as previously indicated, can be added in the form of a metallic compound. In general, with a complexer according to the present invention where coordination between the carboxyl groups of the acidic resin and the complexer is with the amine portion of the complexer, the metal portion of the complexer acts, essentially, as a nucleating agent to create a "bundle" of amine groups.

The metals which can be employed in forming the complexer of the present invention are those which are capable of coordination values in excess of their valence. Such metals include zinc, zirconium, nickel and cobalt. It has further been found that certain other metals which show no tendency to form complex ions can be employed as cometal modifiers to achieve special solubility and performance characteristics.

Additionally, it is within the scope of the present invention to modify the preferred metal with a cometal as characterized by the alkali or alkaline earth metals. Metals such as those in the alkali group can be used to modify the water resistivity and/or affect the rate of resolubilization of the cured film in a mild alkaline solution. They work by providing an inert source of basicity; such metals would be sodium or potassium. Metals such as magnesium have been found effective when used in conjunction with a primary coordination metal, such as zinc, in modifying certain properties such as viscosity and rheology.

Numerous metals are capable of complexer formation which do not exhibit acceptable solution stability or limit application of the vehicle through reduced aqueous solubility, and/or excessive viscosity. Such metals include aluminum and chromium. However, these metals may find limited application when used in conjunction with another metal, such as zinc, to achieve special effects or where significant stability is not a limit to utilization of the vehicle.

Magnesium complexers provide a faster dry than do the zinc or zirconium complexers, but the complexer formed is not as stable. Because of carbon dioxide absorption by barium, complexers formed of this material provide relatively poor shelf stability and may provide problems of precipitation.

Cobalt, iron, and nickel, while providing adequate complexers are generally not as desired because they tend to give the final coating composition a color which is sometimes undesirable. Of course, when the coating composition is to be used as the base for an ink, use of these complexing agents may actually be desirable to reinforce the color of the ink. For example, when a blue ink is to be used, a cobalt complexer may be desirable.

The amine which is used in the complexer has the general formula:

where $a$ is from 2 to 3, $n$ is from 2 to 5, and R is selected from the group consisting of hydrogen and methyl. Preferably, R is hydrogen and $a$ is 2. Of the polyalkylene polyamines, the most preferred material has been found to be triethylene tetramine.

The ratio of the metal to the polyalkylene polyamine is particularly important and, in the case of zinc the molar ratio of amine to metal should be in the range of 0.9 to 6:1. As previously explained, the particular ratio of amine to metal employed will depend on the end use properties desired, to a great extent. Relatively larger amounts of amine will be employed when a high wet rub value is particularly desired. In that situation, the preferred ratio is from 3.5 to 5.5:1, most preferably from 4.5 to 5.0:1. On the other hand, when some wet rub resistance can be sacrificed in favor of a high dry rate, then the ratio should be from about 0.9 to 1.5, preferably from 1 to 1.25. Intermediate values are obtained with intermediate ratios.

Though the complexer formed of the metal and the amine can be effectively employed in forming the coating compositions of the present invention, it is desirable that an acid also be present as a portion of the complexer. Preferred acids are aliphatic $C_6$ to $C_{18}$ monocarboxylic acids, preferably $C_8$ to $C_{14}$, and most preferably $C_{12}$ to $C_{14}$. The molar ratio of acid to metal in the complexer is in the range of from 0 to 1:1, preferably from 0.25 to 0.75:1, and most preferably from 0.25 to 0.5:1. The maximum limit on the acid is imposed because of the plasticizing effect which it imparts to the complexer and the lowering of the free amine component of the complexer. As previously indicated, it is the free amine component of the complexer which coordinates with the acid groups of the acidic resins.

Addition of the acid to the complexer strongly affects the characteristics of the resulting vehicle, such as viscosity, solubility, dry rate, and stability. Thus, the acid is primarily an aid to the coating composition or varnish, rather than to the complexer, itself.

In addition to the aliphatic, monobasic carboxylic acids, aliphatic dibasic acids of $C_4$ to $C_{12}$ and dimerized fatty acids can be employed. Included among these acids are such materials as adipic acid, azelaic acid, sebacic acid and the dimerized $C_{18}$ fatty acids. Further, aromatic and cycloaliphatic acids such as phthalic and tetrahydrophthalic, and their anhydrides, can be used. Though these acids do aid in the drying properties of the ultimate coating composition, they may also cause an approach to the viscosity and insolubility limits in the aqueous medium.

The acidic resin which coordinates with the metal-amine complexer can be selected from a large number of such materials, generally to provide particular properties to the ultimate coating composition. In general, these materials have an acid number of from about 30 to 400 and are, as indicated, capable of coordination to the metal-amine complexer in aqueous solution. The selection of the resin, however, is based primarily on the total application performance and not necessarily on its position on a relative scale of ability to coordinate with a complexer. In addition to the above, the resins must be capable of effective alkaline dispersion in an aqueous medium with a pH of from about 4.0 to 7.5. This capability of dispersion does not mean that the resin solution which results need be clear or stable, but merely that it be a workable mixture to which the complexer can be effectively added at temperatures up to reflux.

It has been found that for a typical rosin-maleic resin, a workable dispersion is formed when approximately 25 to 40 percent of the acid carboxyl groups in the resin are neutralized with ammonia prior to formation of the coating composition. An alkaline material, such as ammonia, is also added subsequently to neutralize up to 60 to 80 percent of the acid groups. The primary function of this alkaline material is to provide a source of hydroxy ions in the aqueous coating composition resulting in a sequestered chelate. Conversely, the loss of this source of volatile hydroxy ions results in the formation of an aqueous inert chelate.

Proper incorporation of ammonia into the system is important in optimizing performance properties and process times involved in the preparation of the coating compositions. Of particular importance is the effect on viscosities resulting from the method of incorporation of the ammonia. Ammonia may also serve as a means of controlling the viscosity of both the pigmented and clear coating composition. Viscosity decreases with increasing pH. In the pigmented varnish, ammonia can significantly affect the grinding or dispersion properties of the various pigments and their resulting application properties. For most pigment systems, a pH of 8.0 to 10.0 is desired, a pH of 8.3–8.7 being preferred. For a clear vehicle, the desired pH is from about 7.3 to 10.0, with a preferred range of 8.0–8.5.

The ratio of the free amine component of the complexer to the carboxyl groups in the acid resin should vary from about 0.4:1 to 1:1. Nearer the upper limits of this ratio, the maximum in wet rub and water resistance is provided. Variations in various properties such as dry rate, wet rub, gloss, viscosity, and solution stability are obtained throughout the range of ratios of free amine component to acid resin. For example, as the FAC/acid resin carboxyl ratio is decreased, in general, the viscosity of the final varnish and the thixotropy of the solution decrease, while the block point of the final film increases. It is possible to obtain a gloss in the final film, as will be defined later, of 100 percent reflectance.

Two methods are available for formation of the complexer and the final coating composition. The first method involves formation of the complexer in a first treating vessel, partial neutraliziation of the acid resin separately, and blending of the two materials followed by dilution to the desired concentration level. In the second method the complexer is formed in situ in essentially all of the ultimately desired amount of water. Ammonia and the acid resin are then added to the solution of the complexer to form the finally desired coating composition.

According to the first method the metal and amine which are to be complexed are added to an aqueous solution with any acid modifier which is to be incorporated, in the amounts previously disclosed. Preferably the formation of the complexer is carried out in water with a solids content of approximately 50 percent. The maximum solids content of the complexer solution during formation is approximately 70 percent as chelation is not achieved when the solids content is higher than this. The formation of a clear, aqueous solution of the complexer is not required.

The desired acid resin which is to be blended with the complexer to form the final coating composition is dispersed in water by the formation of a partial ammonium salt. The pH of this solution must be kept low as water resistance and other desirable properties can be adversely affected in the finally formed film. A pH of approximately 6.5 to 7.5 has been found sastisfactory and this corresponds, for example, with rosin-maleic acidic resins, to a neutralization of from about 25 to 40 percent of the acid carboxyl groups present on the resin. At pH's below this desired range, most of the acid resins either form heterogeneous dispersions, which cannot be properly worked, or have unreasonably high viscosities.

Following formation of the desired resin dispersion, the dispersion is heated to approximately 85° and the complexer solution is added. When the temperature of addition is below 85°C, the rate of desired coordination of the resin and complexer is adversely affected. For example, with rosin-maleic resins, effective coordination does not occur at temperatures below 65°C. After addition of the complexer has been completed, the solution is cooled to 65°C and the pH and non-volatile content of the coating composition are adjusted with ammonia and water. The pH and non-volatile content which are desired are dependent upon the ultimate use. For example, when the coating composition is to be employed as a printing ink vehicle, the preferred pH is approximately 8.5 and the non-volatile content is about 50 percent, or greater. For other uses, such as, overprint varnishes a pH of 7.5 to 8.5 is preferred.

In the second method of forming the coating composition, the in situ method, the complexer is prepared in the presence of all of the water or cosolvents which are to be present in the final coating composition. The complexer and solvent mixture are heated to reflux for times and temperatures dependent upon the particular composition involved. For example, when the composition is 188.8 parts water, 63.1 parts isopropanol, 29.2 parts triethylene tetramine, 13.1 zinc oxide, 13.4 lauric acid, and 23.2 parts stearic acid, refluxing was carried out at 83°–85°C for a period of one to two hours. If adequate initial chelation is not obtained in this step, the performance properties of the final coating composition are adversely affected with, in particular, a significant lowering of the dry rate. After formation of the coordinate through reflux, a quantity of ammonia sufficient for adequate dispersion in the first method is added to the dilute coordinate solution and the desired amount of resin is then added, the last step preferably being carried out at a temperature of about 75°C to 80°C. The entire mixture is then heated to reflux and held there until the resin is found to be in solution. The coating composition is then cooled to 65°C and the pH and non-volatile content adjusted as in the first method. Generally, a temperature of at least 75°C in the refluxing step is required for adequate coordination.

While each of the two methods above have involved the use of either solid or cooled resins, the resin may equally well be employed in a molten condition. Similarly, while aqueous ammonia, such as a 26° Baume ammonia, is generally employed in formation of the coating compositions, gaseous ammonia may be used with effective results.

The preparation of the complexer and of the coating composition is adequately carried out at atmospheric pressure. If desired, however, heating under pressure may be employed instead of refluxing in those situations where refluxing has been indicated.

The complexer and coating composition of the present invention have been described with regard to the essential components and essential conditions of formation. The essential components, as indicated, include, in the complexer, a metal or metal compound and a particular amine with, optionally, a modifying acid. The coating composition includes, as essential components, the complexer, ammonia, and an acid resin. In addition to these essential materials, which include the water used in formation of the compositions, various modifying agents can be used.

Among the modifying agents most frequently used is a cosolvent for the water in the formation of the complexer or final coating composition. In particular, the addition of organic solvents can be useful in modifying application properties, such as the viscosity of the final coating composition. When a cosolvent is used in the in situ method, at least 30 percent water, by weight, based upon the overall composition must still be present. Almost any organic solvent can be used, with the particular solvent selected for end use. Water solubility is not a required property of the solvent. Among the solvents which can be employed are alcohols including primary and secondary alcohols through $C_{10}$ such as ethanol, isopropanol, butanol, etc. Isopropanol is particularly preferred. Tertiary alcohols through $C_6$ can also be employed. Aliphatic esters such as methyl, ethyl, propyl, n-butyl, sec-butyl, and sec-amyl acetate can be effectively employed. Also useful as cosolvents are ketones such as acetone, methyl ethyl ketone, diethyl ketone, methyl isobutyl ketone, cyclohexanone, and diacetone alcohol. Other possible cosolvents are ethylene glycol monoethyl ether and its higher homologs, ethylene-glycol monoethyl ether acetate, the monoethyl and monobutyl ethers of diethylene glycol and related glycol-ethers. In addition, aromatics, such as toluene, and aliphatic solvents, such as heptane, can be used. The criteria as to the type of cosolvent is the end use of the material and the desire to avoid pollution of the environment, generally. The major problem with the use of solvents which are not compatible with water is a decrease in the subsequent aqueous dilutability.

Antifoam agents are particularly useful in formation of the final coating composition of the present invention as an aid in application of the composition. While various of the cosolvents previously referred to can influence the foaming tendencies of the coating composition, specialized antifoam agents are particularly preferred. The silicone antifoam materials have proven the most effective.

The modifying agents previously referred to are not to be considered exhaustive of those which may be employed. In general, modifying agents to achieve various properties can be employed so long as they do not interfere with formation of the complexer or coordination of the complexer with the acid resin.

The aqueous coating compositions of the present invention have a number of novel, desirable, or important properties which distinguish them from the coating compositions of the prior art. For example, it is a general characteristic of aqueous solutions of organic resins of the prior art that there is an exponential increase in the viscosity of the aqueous solution as the molecular weight of the resin is increased. For that reason, use of aqueous solutions of many of such resins and polymers has been restricted in many applications because of the inability to achieve workable viscosities and solids contents at a molecular weight which will provide necessary properties, such as an adequate melting point. In accordance with the present invention, the coating compositions are capable of providing films of high melting or blocking properties when deposited from an aqueous solution, while maintaining a low viscosity.

Further, as previously indicated with regard to cosolvents, the aqueous coating compositions of the present invention have a high dilutability with water-insoluble organic solvents. This provides a variety of advantages in application of the composition.

For printing inks, as well as other uses, an important property of the coating composition is its dry rate. This is the rate at which tack-free films will form when the coating composition is applied as a thin coating to a suitable substrate. Most ammoniacal solutions of polymers and resins have a relatively slow dry rate when compared to emulsion polymers. This difference is in addition to the reduction in dry rate realized when water is used as the coating vehicle, rather than highly volatile organic solvents. The coating composition of the present invention is an aqueous resin solution which has a high rate of dry when compared to simple ammoniacal solutions of the resin component independent of the complexer.

Many of the coating compositions of the prior art, such as those referred to in the patents already issued, have been capable of forming films with increased water resistivity from aqueous solutions, dispersions, or emulsions. However, the applications have been restricted to those where high solids contents, e.g. 50 percent or greater, were not required or where a high basicity, such as a pH greater than 9, could be tolerated. The coating composition of the present invention can have a high solids content and low viscosity in an aqueous resin solution and provide stable dispersions at a pH tolerable to most organic pigments and dyes.

A particularly novel aspect of the coating compositions of the present invention is their ability to wet various nonporous substrates, such as polyethylene, polystyrene, cellophane, cellulose acetate, and metal foils, particularly aluminum foils. In general, water based resin coating compositions show excessive crawling and poor wetting of these materials. This novel property of the present coating compositions makes them useful in inks for solvent-flexography and flexible package printing.

In order that those skilled in the art may be better enabled to practice the present invention, the following examples are given by way of illustration, and not by way of limitation. In these examples, various tests and parameters are indicated and these are determined by the methods indicated below:

1. Percent Solids in Vehicle Solution—The determination is made using an OHAUS moisture balance. The values indicate the weight percent of non-volatile materials contained in the aqueous solution.

2. Gardner Color—This test is made according to ASTM Test Method D—1544, Test for Color of Transparent Liquids.

3. pH—This determination is by ASTM Method E—70, pH of Aqueous Solutions With the Glass Electrode.

4. Viscosity, G/H—This is a determination of viscosity according to the Gardner-Holdt bubble viscometer. This involves a comparative viscosity method included in ASTM D—1545, Test for Viscosity by Bubble Time Method.

5. Water Reducibility—This is defined as the grams of water required to reach a cloud point when added to 15 grams of a 50 ± 1 percent solids sample of an aqueous solution of a resin.

For evaluation of various coating compositions according to the present invention as ink carriers, barium lithol was used as the ink pigment. This selection was made because barium lithol has a tendency to give highly thixotropic and troublesome aqueous dispersions. To standardize test conditions, a base grind of the barium lithol was prepared and various test resins and coating compositions were added to it. Only the solid portion of the aqueous pigment base and the aqueous test varnish are considered. In comparing the inks to each other the following test measurements were employed:

1. Gloss, 60°—This is determined according to ASTM Method D—523, Specular Gloss at 60°. Films to be measured are prepared from a 3-mil wet film of the ink on file folder stock. The films are prepared from a Bird-Film Applicator and measurements are taken after 24 hours of drying under ambient conditions.

2. Wet/Rub Abrasion, Cycles—This test was devised to measure the relative water resistivity of films under conditions of mild abrasion. The apparatus, essentially, is a felt-covered block connected through a drive mechanism to a motor so that it travels a reciprocating path at a rate of 37 cycles per minute. The basic apparatus is described in FTMS 141, Method 6141, Washability of Paints.

3. Dry Rate, Mils—This test was developed to determine the relative dry rates of coating compositions according to the present invention and the inks prepared from them. Similar tests are employed in the industry. The test method involves the tendency of a wet ink film to transfer from one surface to another. A dispersion gauge is used to cast an initial film. The gauge, specified in ASTM Method D—1210, Fineness of Dispersion of Pigment-Vehicle Systems, consists of a steel block about 180 mm. long, 63.4 mm. wide, and 12.7 mm. thick. A wedge-shaped channel is cut down the block tapering from 4 mils at the deep end to zero at the other end. A scraper is provided with the gauge. An excess of sample ink is placed in the deep end of the channel and the excess is drawn down to the shallow end with the scraper. After a ten second interval, a paper sheet is laid over the block and pressed using a litho hand proofer. The paper is then removed and allowed to dry for 15 seconds. It is folded over upon itself and again pressed with a hand proofer. The resulting offset of ink is then read to the nearest 0.1 mil, with the test value indicating depth, to the nearest 0.1 mil, of wet ink on the gauge where transfer failed to occur. This value is indicative of dry rates which could be anticipated from the ink on a printing press. The test has been found to be reproducible.

4. Viscosity, F/S—Measurements are made using a Brookfield Thermosel Chamber and are read in cps. The term F/S refers to the ink solids, full strength, and indicates an ink prepared, but at a higher viscosity than allowable by the printing method. Inks adjusted to press viscosity are referred to as press ready.

In the examples below, three types of acid resin were employed. Resin-type I was a rosin maleic-modified alkyd resin with a composition as follows:

| Component | Parts by Weight |
| --- | --- |
| Tall Oil Fatty Acids | 24.6 |
| Rosin-Fumarate | 18.9 |
| Polybasic Acid | 31.1 |
| Polyhydric Alcohol | 25.4 |

Resin-type II was a partial ester of a tall oil rosin malaic adduct. Upon reaction of rosin with maleic anhydride or fumaric acid, the material undergoes the Diels-Alder reaction to produce a trifunctional acid.

Resin-type III was the partial ester of a gum rosin maleic adduct. The type III resin is similar to the type II resin, differing, principally, in the source of rosin.

Table I below provides various properties of these three types of resins:

TABLE I

| Typical Properties | RESIN Type I | Type II | Type III |
| --- | --- | --- | --- |
| Melting point, R and B | 60° C | 130° C | 138° C |
| Acid number | 95 | 225 | 250 |
| Color - rosin standard | WW | M | WG |
| Properties of an Ammoniacal Solution | | | |
| % solids | 50 | 50 | 50 |
| pH | 8.5 | 8.5 | 8.5 |
| Viscosity at 25° C, G/H | V-W | J+ | I-J |
| Color - Gardner | 11– | 11– | 12– |
| Water reducibility | >150 | >150 | >150 |
| Barium Lithol Ink Analysis | | | |
| Pigment/Resin ratio - ⅓ | | | |
| Gloss 60° | 90 | 45 | 40 |
| Wet/Rub abrasion, 24 hr. | 9 | 75 | 45 |
| Dry rate, mils | 0.5 | 0.9 | 0.7 |
| Viscosity, F/S, cps | 322 | 790 | 710 |

EXAMPLE 1

A preferred complexer was formed according to the second method of complexer formation disclosed above. The complexer included 29.2 parts triethylene tetramine, 13.1 parts zinc oxide, 13.4 parts lauric acid, and 12 parts of mixed $C_{16}$ and $C_{18}$ acids, commercial stearic acid. A quantity of 230.8 parts of resin type II, 188.8 parts water, 63.1 parts isopropyl alcohol and 23.2 parts 26° ammonia were also used. After formation, the material was treated as previously described, with dilution to 50 percent solids and a pH of 8.5, and the following properties were obtained:

| | |
| --- | --- |
| Viscosity G/H | J-M |
| Color—Gardner | 11 |

The properties of a barium lithol ink formulation made from the coating composition with a pigment/resin ratio of 1/3 were as follows:

| | |
| --- | --- |
| Gloss 60° | 90 |
| Wet/Rub Abrasion | 300 cycles |
| Dry Rate | 1.7 mil |
| Viscosity F/S | 550 cps |
| Melting Point (Fisher-Johns) | 136°C |

The stearic acid used here was Century 1220, though other stearic acids can be employed with some change in final properties.

EXAMPLE 2

A complexer was formed according to the second, in situ method of formation described above. This complexer was formed with 27.8 parts triethylene tetramine, 8.3 parts zinc oxide, 4.1 parts barium oxide, 12.7 parts lauric acid, and 11.4 parts of commercial stearic acid. The solution in which the complexer was formed contained 200 parts water and 36 parts isopropyl alcohol. To this was added 22.1 parts ammonia and 219.6 parts of resin type II. Upon dilution of the composition and adjustment to a pH of 8.5, the coating composition showed the following properties:

| | |
|---|---|
| Viscosity G/H | M–N |
| Color—Gardner | 12– |
| Water Reducibility | 80 |
| Percent Solids | 49.7 |

Upon being formed into a barium lithol ink with a pigment/resin ratio of 1/3, the following properties were obtained:

| | |
|---|---|
| Gloss 60° | 33 |
| Wet/Rub Abrasion, 24 hour | 700 cycles |
| Dry Rate | 1.0 mil |
| Viscosity—F/S | 800 cps |

EXAMPLE 3

A complexer was formed according to method 1 employing 225 parts water, 127.4 parts triethylene tetramine, 17.8 parts zinc oxide, and 79.9 parts benzoic acid. In a separate vessel a dispersion of 1,594 parts type I resin, 68 parts of 26° Baume ammonia, and 1,330 parts water was formed. The two were mixed together by the procedure previously described and to this was added 200 parts of an ammonia/water composition. The resulting coating composition showed the following properties:

| | |
|---|---|
| Viscosity G/H | X+ |
| Color—Gardner | 12 |
| Percent Solids | 49.9 |
| pH | 8.5 |

The material was formed into a barium lithol ink formulation with a pigment/resin ratio of 1/1.5 and showed the following properties:

| | |
|---|---|
| Gloss 60° | 49 |
| Wet/Rub Abrasion, 24 hour | Greater than 3,000 cycles |
| Dry Rate | 0.8 mil |
| Viscosity—F/S | 1,600 cps |

EXAMPLE 4

A complexer was formed according to the first method employing 225 parts water, 134.1 parts triethylene tetramine, 18.7 parts zinc oxide, and 72.2 parts isophthalic acid. In a separate vessel a resin dispersion was formed from the same components and amounts as set forth in Example 3. The resin dispersion was added to the complexer by the methods previously described and to the resulting mixture was added 200 parts of an ammonia/water composition. The resulting coating composition had the following properties:

| | |
|---|---|
| Viscosity G/H | Y–Z |
| Color—Gardner | 12+ |
| Percent Solids | 49.8 |
| pH | 8.5 |

A barium lithol ink formulation was formed with this coating composition employing a pigment/resin ratio of 1/1.5. The properties of the film resulting from this coating composition were as follows:

| | |
|---|---|
| Gloss 60° | 36 |
| Wet/Rub Abrasion, 24 hour | 1,810 cycles |
| Dry Rate | 0.7 mil |
| Viscosity—F/S | 1,600 centipoise |

EXAMPLE 5

A complexer was formed according to method 1 employing 100 parts water, 48.8 parts triethylene tetramine, 15.9 parts zinc oxide, and 35.3 parts adipic acid. In a separate vessel a resin dispersion was formed with the same componentes and amounts as shown in Example 3. The resin dispersion was added to the complexer and, following processing as previously described, 200 parts of an ammonia/water solution was added. The resulting coating composition had the following characteristics:

| | |
|---|---|
| Viscosity G/H | B– |
| Color—Gardner | 13– |
| Percent Solids | 50.1 |
| pH | 8.5 |

A barium lithol ink formulation was prepared with a pigment/resin ratio of 1/1.5. This material had the following properties:

| | |
|---|---|
| Gloss 60° | 40 |
| Wet/Rub Abrasion, 72 hours | 260 cycles |
| Dry Rate | 0.6 mil |
| Viscosity—F/S | 860 cps |

EXAMPLE 6

A complexer was formed according to the second procedure previously described employing 29.2 parts triethylene tetramine, 13.1 parts zinc oxide, 13.4 parts lauric acid, 12.0 parts oleic acid, and 188.8 parts water. Also included were 230.8 parts of type II resin, 23.2 parts 26° ammonia, and 63.1 parts isopropanol. After formation, the composition was adjusted with an ammonia/water composition to the desired solids and pH. The properties of the resulting coating composition were as follows:

| | |
|---|---|
| Viscosity G/H | S |
| Color—Gardner | 11+ |
| Percent Solids | 49.5 |
| pH | 8.5 |
| Water Reducibility | 100 |

A barium lithol ink formulation was prepared from this coating composition with a pigment/resin ratio of 1/3. This material had the following properties:

| | |
|---|---|
| Gloss 60° | 75 |
| Wet/Rub Abrasion | 250 cycles |
| Dry Rate | 1.5 mils |
| Viscosity—F/S | 1,200 cps |

EXAMPLE 7

Employing the second method of in situ formation, a complexer was prepared employing 29.2 parts triethylene tetramine, 13.1 parts zinc oxide, 13.4 parts lauric acid, 10.8 parts dimer fatty acid, 188.8 parts water and 63.1 parts isopropanol. To the formed complexer was added 23.2 parts 26° Baume ammonia and then 230.8 parts of type II resin. Upon formation of the coordinate, the final coating composition was formed by the addition of 10.1 parts of an ammonia/water mixture. The coating composition had a solids concentration of 49.7 percent and a pH of 8.5.

EXAMPLE 8

A complexer was formed according to the second method of in situ formation employing 30.7 parts triethylene tetramine, 13.7 parts zinc oxide, 9.8 parts crotonic acid, 184.5 parts water, and 66.3 parts isopropyl alcohol. Upon formation of the chelate 24.4 parts 26° Baume ammonia was added followed by 242.6 parts type II resin in the manner previously described. Upon formation of the coordinate the ultimate coating composition is formed by the addition of 27.4 parts of an ammonia/water mixture. The formed coating composition had a solids percentage of 49.5 and a pH of 8.5.

In the following examples a mixture of resins was employed to form the coating composition.

EXAMPLE 9

A complexer was formed by the second method of in situ formation employing 29.2 parts triethylene tetramine, 13.1 parts zinc oxide, 13.4 parts lauric acid, 12 parts commercial stearic acid, 188.8 parts water, and 63.1 parts isopropyl alcohol. Upon formation of the chelate as previously described, a quantity of 23.2 parts 26° Baume ammonia was added followed by a mixture of 115.4 parts type II resin and 115.4 parts of an ammoniacally-soluble acrylic copolymer sold by S. C. Johnson under the trade name JONCRYL 67. The resulting mixture was processed in the manner previously described and was then adjusted with 16 parts of 26° ammonia and 10.1 parts of an ammonia/water mixture. The resulting coating composition had the following properties:

| | |
|---|---|
| Viscosity G/H | X |
| Color—Gardner | 10— |
| Percent Solids | 49.6 |
| pH | 8.5 |
| Water Reduction | Greater than 200 |

A barium lithol ink formulation was formed with the coating composition having a pigment/ratio of 1/3. The material had the following properties:

| | |
|---|---|
| Gloss 60° | 30 |
| Wet/Rub Abrasion, 24 hours | 330 cycles |
| Dry Rate | 1.7 mils |
| Viscosity—F/S | 3,800 cps |

EXAMPLE 10

A complexer was formed according to the second method of in situ formation employing 188.8 parts water, 63.1 parts isopropanol, 29.2 parts triethylene tetramine, 13.1 parts zinc oxide, 13.4 parts lauric acid, and 12.0 parts commercial stearic acid. Following formation of the chelate in the manner previously described, a quantity of 23.2 parts 26° Baume ammonia was added followed by the addition of 196 parts type II resin and 34.6 parts of an ammoniacally soluble styrene-maleic copolymer marketed by ARCO Chemical Corporation under the trade description SMA No. 17352—A. Upon formation of the coordinate the material was modified by the addition of 16 parts 26° Baume ammonia and 10.1 parts of an ammonia/water mixture. The resulting coating composition had the following properties:

| | |
|---|---|
| Viscosity G/H | V–W |
| Color—Gardner | 11– |
| Percent Solids | 49.4 |
| pH | 8.5 |
| Water Reduction | Greater than 200 |

A barium lithol ink formulation was prepared from this coating composition with a pigment/resin ratio of 1/3. This material had the following properties:

| | |
|---|---|
| Gloss 60° | 50 |
| Wet/Rub Abrasion, 48 hours | 250 cycles |
| Dry Rate | 2.3 mils |
| Viscosity Ink—F/S | 3,500 cps |

EXAMPLE 11

According to the second method of in situ formation a complexer was formed employing 798.6 parts water, 119.7 parts isopropyl alcohol, 92.4 parts triethylene tetramine, 13.4 parts zinc oxide, 84.6 parts lauric acid, and 73.4 parts commercial stearic acid. Upon formation of the chelate the complexer was first modified by the addition of 39.1 parts polyethylene glycol sold under the trade name CARBOWAX 4000 and then by the addition of 73.4 parts 26° Baume ammonia. In the manner previously described for a type 2 preparation a quantity of 730.2 parts of type II resin was then added. After formation of the coordinate the material was modified by the addition of 50.5 parts 26° Baume ammonia and 32.1 parts of an ammonia/water mixture. The resulting coating composition had the following properties:

| | |
|---|---|
| Viscosity G/H | J |
| Color—Gardner | 13– |
| Percent Solids | 49.8 |
| pH | 8.5 |
| Water Reduction | 88 |

A barium lithol ink formulation with a pigment/resin ratio of 1/3 was formed from this coating composition. The resulting material had the following properties:

| | |
|---|---|
| Gloss 60° | 100 |
| Wet/Rub Abrasion | 280 cycles |
| Dry Rate | 0.8 |
| Viscosity—F/S | 430 cps |

EXAMPLE 12

Four different complexers were made for use in the examples below. These are defined in Table 2 in accordance with the amine equivalents, equivalents of metal, equivalents of acid modifier, ratios of amine to metal, and the free amine component of the complexer:

TABLE 2

| Type | Composition | Total Amine Equivalents (1) | Metal (2) | Acid Modifier | Mole Ratio Amine/Metal | Free Amine Component |
|---|---|---|---|---|---|---|
| A | TETA (triethylene tetramine) Zinc Oxide Lauric Acid | 2.254 | 0.2202 | 0.180 | 3.42 | 1.856 |
| B | TETA Zinc Oxide Lauric Acid | 1.856 | 0.172 | 0.215 | 3.42 | 1.470 |
| C | TETA Zinc Oxide Lauric Acid | 1.931 | 0.339 | 0.171 | 2.10 | 1.421 |
| D | TETA Zinc Oxide Lauric Acid | 1.690 | 0.442 | 0.182 | 1.141 | 1.065 |

(1) Based on total active hydrogens. Thus, TETA has an effective functionality of 6.
(2) Mole fraction based on metal valence.

A series of coating compositions according to the present invention were made with complexers, as previously described, having varying free amine components and ratios of amine to zinc in the complexer. Each composition was made using the type I resin, previously referred to, with a carboxyl equivalent of 0.246 per 100 grams. The comparison between the examples illustrates the variations in water resistivity as a function of the complexer free amine component and the acidity of the composition. It can be seen that as the free amine component decreases in value and as the ratio of amine to zinc decreases in value, with the same resin, the amount of complexer which must be employed for optimum water resistivity increases. The optimum complexer concentration, calculated, as indicated, is determined by dividing the carboxyl equivalents for 100 grams of the base resin by the amine factor of the complexer and multiplying by 100, giving the result in grams of complexer solids per 100 grams of base resin. It must be recognized that this is the optimum only for water resistivity. The results are indicated below in Table 3.

EXAMPLE 13

The performance of an ink made with the coating composition of the present invention can be varied by varying the pigment-to-resin ratio, as well as varying the other properties set forth above. A series of ink formulations were prepared employing the coating composition of Example 1, but with varying pigment-to-resin ratios. These are illustrated in Table 4 below and show that as the pigment-to-resin ratio decreases, inter alia, the gloss increases, the wet rub properties are improved, and the viscosity decreases. These results are illustrated in Table 4.

TABLE 4

VI. B.
INK PERFORMANCE VARIATIONS WITH CHANGES IN THE PIGMENT-TO-RESIN RATIO

| Wt. Ratio, Pigment/Resin | 1/1 | 1/1.5 | 1/2 | 1.25 | 1/3 |
|---|---|---|---|---|---|
| Ink Gloss, 60° | 18 | 52 | 67 | 90 | 100 |
| Ink Wet-Rub, Cycles to Failure | 370 | 415 | 450 | 575 | 900 |
| Ink Dry Rate | 0.9 | 0.9 | 0.9 | 1.0 | 1.0 |
| Ink Viscosity, F/S | 595 | 570 | 525 | 460 | 450 |
| Ink Thixotropy | none | none | none | none | none |

EXAMPLE 14

The following example shows the effect which modifying acids in the complexer may have upon the materials formed with the complexer. It will be noted that the comparisons are with a complexer formed with no modifying acid and that that formulation provides a totally acceptable product.

TABLE 3

VI. A.
WATER RESISTIVITY AS A FUNCTION OF THE COMPLEXER FREE AMINE COMPONENT AND TOTAL COMPOSITION ACIDITY

| Complexer Type | Complexer Free Amine Component | Mole Ratio Amine/Zn | Water Resistance of Ink Film, in Wet-Rub Cycles to Failure, With Variations in Complexer Level (Parts Per 100 Parts Resin) | | | | | Optimum Complexer Concentration, Calculated |
|---|---|---|---|---|---|---|---|---|
| | | | 10 | 15 | 20 | 25 | 30 | |
| A | 1.86 | 3.42 | 303 | >3,000 | 1,100 | 712 | 84 | 13.2 |
| B | 1.47 | 3.42 | 175 | 2,650 | 1,980 | 570 | 165 | 16.7 |
| C | 1.42 | 2.10 | 162 | 1,250 | >3,000 | 760 | 250 | 17.2 |
| D | 1.07 | 1.07 | 120 | 538 | 600 | 2,350 | 1,015 | 23.0 |

TABLE 5

COMPLEXER ACID MODIFIERS: EFFECTS OF FATTY ACID CHAIN LENGTH ON INK PERFORMANCE

| Lab Code | Complexer — Type E Acid Modifiers | | | Viscosity | | Gloss 60° | W/R Abr. | Dry Rate | Water Reduction | Source of Fatty Acid |
|---|---|---|---|---|---|---|---|---|---|---|
| | C-12 | C-16 | C-18 | Varnish | Ink | | | | | |
| A | | NONE | | V | 2400 | 30 | 100 | 2.5 | 50 | NONE |
| B | 100 | — | — | U+ | 1500 | 55 | 145 | 2.0 | >150 | Commercial lauric acid |
| C | — | 45 | 55 | K | 485 | 70 | 205 | 1.6 | 100 | Commercial stearic acid |
| D | 27 | 38 | 35 | M— | 740 | 43 | 135 | 1.4 | 100 | Mixture of 2 and 3 |
| E | 54 | 25 | 21 | K–L | 600 | 90 | 200 | 1.8 | 120 | do. |
| F | 64 | 20 | 16 | J | 390 | 60 | 260 | 1.3 | 88 | do. |

EXAMPLE 15

The coating composition of the present invention functions with a wide variety of pigments other than the one described in the previous example. In the following examples which illustrate the use of the coating composition of the present invention with other pigments, the terms base grind and let-down are employed. These refer to the method of preparation. In this method of ink preparation the ink pigment is first ground in a steel ball mill in a minimum quantity of the vehicle. Other pigment dispersing equipment can also be used. The grinding ratio is a function of the pigment and is referred to as the oil absorption. After an adequate dispersion or wetting of the pigment, usually six to ten hours, the mill is stopped and the let-down is added. The mill is then restarted and pigment grind and let-down are allowed to mix. The mill is then discharged and the product is referred to as pigment base. A full-strength ink is then prepared by the addition of further vehicle, water, and other additives, such as antifoam agents, etc. with the relative ratios of materials being determined by the exact pigment-to-resin ratio desired. All, or any part, of the additives may be added to the grind or the subsequent let-down. Printing vehicles for employing the materials of the present invention with various pigments are illustrated below in Table 6.

ammonia, and 87 parts water was added to the complexer and processing was completed. A quantity of 5 parts of an ammonia/water mixture were then added. The formed composition showed the following properties:

| | |
|---|---|
| Viscosity G/H | M |
| Color—Gardner | 13– |
| Percent Solids | 49.7 |
| pH | 8.5 |

A barium lithol ink formulation made from the material with a pigment/resin ratio of 1/1.5 showed the following properties:

| | |
|---|---|
| Gloss 60° | 39 |
| Wet/Rub Abrasion 24 hour | 390 cycles |
| Dry Rate | 0.9 mil |
| Viscosity | 895 cps |

EXAMPLE 17

In accordance with the first method of complexer formation a complexer was formed from 13.9 parts water, 3.9 parts zinc oxide and 10 parts diethylenetriamine. A mixture was made from 100 parts type I resin, 87 parts water, and 8 parts 26° ammonia and this

TABLE 6

| I. Base Grind | 1 Red | 2 Blue | 3 Yellow | 4 Yellow | 5 Black | 6 White |
|---|---|---|---|---|---|---|
| Pigment | 20 | 20 | 20 | 35 | 20 | 35 |
| Material of Example 1 | 10 | 20 | 20 | 10 | 20 | 10 |
| Water | 20 | 40 | 25 | 15 | 30 | 15 |
| | | Grind and add let-down | | | | |
| Material of Example 1 | 30 | 20 | 20 | 30 | 30 | 30 |
| Water | 20 | — | 15 | 8 | — | 8 |
| II Ink Formula — Pigment/Resin Ratio 1/3 | | | | | | |
| Base Grind | 50 | 50 | 50 | 32 | 50 | 32 |
| Material of Example 1 | 45 | 40 | 40 | 54.5 | 35 | 54.5 |
| Dry Wax | 0.5 | 0.5 | 0.5 | 0.5 | 0.5 | 0.5 |
| Water | 4.5 | 9.5 | 9.5 | 13 | 14.5 | 13 |

(1) Red — American Cyanamid Barium Lithol Red 20-4210.
(2) Blue — DuPont's Phthalo Blue BT 4175.
(3) Yellow — Federal Colors' Benzidine Yellow AAA 10010.
(4) Yellow—Reichhold's Yellow Primrose 205.
(5) Black—Columbia Carbons Carbon Black.
(6) White—American Cyanamid's White $TiO_2$ O R 5 8 0.

EXAMPLE 16

A composition was prepared according to method 1. The complexer included 22 parts water, 12 parts 22 percent zinc octoate, and 10 parts tetraethylenepentamine. A mixture of 100 parts type I resin, 8 parts 26° was added to the previously formed complexer. After completion of processing, the pH and non-volatile content of the blend was adjusted with 5 parts of an ammonia/water mixture to make up for losses during processing. The composition formed showed the following properties:

| | |
|---|---|
| Viscosity G/H | V–W |
| Color—Gardner | 12+ |
| Percent Solids | 50.1 |
| pH | 8.5 |

A barium lithol ink was formed from this composition with a pigment/resin ratio of 1/1.5. The same formulation showed the following properties:

| | |
|---|---|
| Gloss 60° | 27 |
| Wet/Rub Abrasion, 24 hour | 542 cycles |
| Dry Rate | 0.7 mil |
| Viscosity—F/S | 690 cps |

EXAMPLE 18

A complexer was formed according to the second, in situ method of formation described above. This complexer was formed with 26.8 parts triethylene tetramine, 10.8 parts zinc oxide, 1.2 parts magnesium oxide, 12.2 parts lauric acid, and 6.1 parts commercial stearic acid. The solution in which the complexer was formed contained 186.7 parts water and 64.2 parts isopropyl alcohol. To this was added 23.6 parts 26° ammonia and 241.4 parts of resin type II. Upon dilution of the composition and adjustment to a pH of 8.7, the coating composition showed the following properties:

| | |
|---|---|
| Viscosity G/H | M–N |
| Color—Gardner | 11+ |
| Water Reducibility | 70 |
| Percent Solids | 49.5 |

Upon being formed into a barium lithol ink with a pigment/resin ratio of 1/3, the following properties were obtained:

| | |
|---|---|
| Gloss 60° | 70 |
| Wet/Rub Abrasion, 48 hour | 280 cycles |
| Dry Rate | 1.5 mil |
| Viscosity—F/S | 745 cps |

The various coating compositions of the present invention, particularly as illustrated in the examples above, can be employed without forming an ink vehicle. Thus, these various coating compositions can be employed alone for coatings, such as an overprint varnish, and will develop the various properties set forth in this application, such as wet/rub resistance, gloss, and rapid drying time.

While various specific formulations have been illustrated above for complexers and coating compositions, it will be realized that these are for purposes of illustration and the invention should not be considered as limited except in accordance with the appended claims.

I claim:

1. A metal amine complexer, contained in an aqueous solution, consisting essentially of:
   a. zinc;
   b. from 0.9 to 6 moles, per mole of the metal, of a polyalkylene polyamine having the formula:

$$NH_2[(CHR)_aNH]_nH,$$

where $a$ is from 2 to 3, $n$ is from 2 to 5, and each R is selected from the group consisting of hydrogen and methyl; and
   c. at least one aliphatic, monocarboxylic acid having from six to 18 carbon atoms.

2. The metal amine complexer of claim 1 having, in addition to zinc, a co-metal selected from the class consisting of alkali and alkaline earth metals.

3. The metal amine complexer of claim 2 wherein the co-metal is barium.

4. The metal amine complexer of claim 2 wherein the co-metal is magnesium.

5. The metal amine complexer of claim 1 wherein at least one of the aliphatic, monocarboxylic acids has from eight to 14 carbon atoms.

6. The metal amine complexer of claim 5 wherein at least one of the aliphatic, monocarboxylic acids has from 12 to 14 carbon atoms.

7. The complexer of claim 6 wherein the monobasic acid is lauric acid.

\* \* \* \* \*